US012785949B2

(12) United States Patent
Pascucci et al.

(10) Patent No.: US 12,785,949 B2
(45) Date of Patent: *Nov. 3, 2026

(54) DELAYED QUANTUM KEY-DISTRIBUTION

(71) Applicant: Juniper Networks, Inc., Sunnyvale, CA (US)

(72) Inventors: Jason R. Pascucci, Milford, MA (US); Melchior Dirk Frederik Aelmans, Voorschoten (NL); Gert Grammel, Ditzingen (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/410,946

(22) Filed: Jan. 11, 2024

(65) Prior Publication Data

US 2024/0146519 A1 May 2, 2024

Related U.S. Application Data

(63) Continuation of application No. 17/449,487, filed on Sep. 30, 2021, now Pat. No. 11,895,234.

(51) Int. Cl.
*H04L 9/08* (2006.01)

(52) U.S. Cl.
CPC .......... *H04L 9/0858* (2013.01); *H04L 9/0825* (2013.01); *H04L 9/0855* (2013.01); *H04L 9/0866* (2013.01)

(58) Field of Classification Search
None
See application file for complete search history.

(56) References Cited

U.S. PATENT DOCUMENTS 9,608,813 B1 * 3/2017 Roth .................... H04L 9/3234
10,305,688 B2 5/2019 Fu et al.
(Continued)

FOREIGN PATENT DOCUMENTS

CN 105871538 A 8/2016
CN 111181717 A 5/2020
(Continued)

OTHER PUBLICATIONS

Extended European Search Report for Application No. EP21211722, mailed on May 20, 2022, 9 pages.
(Continued)

*Primary Examiner* — Trang T Doan
(74) *Attorney, Agent, or Firm* — Harrity & Harrity, LLP

(57) ABSTRACT

A node may receive, from a quantum key-distribution (QKD) device, a first message that includes an identifier associated with a key. The node may send, to another node, a second message that includes the identifier and a request to perform at least one task. A node may receive, from the other node, a third message that includes information associated with performance of the at least one task by the other node and information indicating a time of performance. The node may receive, from the QKD device, a fourth message that includes the key and information indicating a time window associated with the quantum key; wherein the fourth message is received after expiration of the time window. The node may process, based on the fourth message, the third message to determine whether the third message is valid and thereby cause one or more actions to be performed.

20 Claims, 12 Drawing Sheets

(56) References Cited

U.S. PATENT DOCUMENTS

| | | | | |
|---|---|---|---|---|
| 10,567,089 | B2 | 2/2020 | Murakami et al. | |
| 10,757,083 | B2 | 8/2020 | Fu et al. | |
| 2009/0204806 | A1* | 8/2009 | Kanemura | G06F 21/445 713/155 |
| 2016/0253651 | A1* | 9/2016 | Park | G06Q 20/34 705/39 |
| 2017/0061419 | A1* | 3/2017 | Kim | G06Q 10/00 |
| 2017/0308895 | A1* | 10/2017 | Srivastava | G06Q 20/3821 |
| 2018/0109372 | A1 | 4/2018 | Fu | |
| 2020/0120408 | A1 | 4/2020 | Boyd et al. | |
| 2020/0358606 | A1 | 11/2020 | Zhao et al. | |
| 2021/0083864 | A1 | 3/2021 | Bush | |
| 2023/0099471 | A1 | 3/2023 | Pascucci et al. | |

FOREIGN PATENT DOCUMENTS

| | | | |
|---|---|---|---|
| CN | 112131564 | A | 12/2020 |
| WO | 2016118359 | A1 | 7/2016 |

OTHER PUBLICATIONS

Wang et al., "Applications and Use Cases for the Quantum Internet draft-irtf-qirg-quantum-internet-use-cases-05," Internet-Draft: Qirg, Internet Engineering Task FO, Mar. 29, 2021, vol. 5, pp. 1-28, XP015145165, Retrieved from the Internet: [URL: https://datatracker.ietf.org/doc/html/draft-irtf-qirg-quantum-internet-use-cases-05] [retrieved on Mar. 29, 2021].

* cited by examiner

DELAYED QUANTUM KEY-DISTRIBUTION

RELATED APPLICATION

This application is a continuation of U.S. patent application Ser. No. 17/449,487, filed Sep. 30, 2021, which is incorporated herein by reference in its entirety.

BACKGROUND

Quantum key-distribution (QKD) uses quantum physics to securely agree on symmetric encryption keys. To generate a key, two QKD devices exchange quantum states (e.g., using polarized photons) by utilizing a quantum communication channel (e.g., an optical channel) or free space (e.g., a line-of-sight connection between a terrestrial QKD device and a QKD device included in a satellite).

SUMMARY

Some implementations described herein relate to a method. The method may include receiving, by a node and from a quantum key-distribution device, a first message that includes an identifier associated with a key, where the key is associated with a particular time window. The method may include sending, by the node and to another node, a second message that includes the identifier associated with the key and a request to perform at least one task. The method may include receiving, by the node and from the other node, a third message that includes information associated with performance of the at least one task by the other node and information indicating a time of performance of the at least one task by the other node. The method may include receiving, by the node and from the quantum key-distribution device, a fourth message that includes the key and information indicating the particular time window, where the fourth message is received after expiration of the particular time window. The method may include processing, by the node and based on the fourth message, the third message to determine whether the third message is valid. The method may include causing, by the node and based on determining whether the third message is valid, one or more actions to be performed.

Some implementations described herein relate to a non-transitory computer-readable medium that stores a set of instructions for a quantum key-distribution device. The set of instructions, when executed by one or more processors of the quantum key-distribution device, may cause the quantum key-distribution device to communicate with another quantum key-distribution device to cause a key to be generated. The set of instructions, when executed by one or more processors of the quantum key-distribution device, may cause the quantum key-distribution device to determine an identifier associated with the key. The set of instructions, when executed by one or more processors of the quantum key-distribution device, may cause the quantum key-distribution device to determine a particular time window associated with the key. The set of instructions, when executed by one or more processors of the quantum key-distribution device, may cause the quantum key-distribution device to send, to a node, a first message that includes the identifier associated with the key. The set of instructions, when executed by one or more processors of the quantum key-distribution device, may cause the quantum key-distribution device to send, to the node, a second message that includes the key and information indicating the particular time window.

Some implementations described herein relate to a node. The node may include one or more memories and one or more processors. The node may be configured to receive, from another node, a first message that includes an identifier associated with a key and a request to perform at least one task. The node may be configured to send, to a quantum key-distribution device, a second message that includes the identifier associated with the key. The node may be configured to receive, from the quantum key-distribution device, a third message that includes the key and information indicating a particular time window associated with the key. The node may be configured to perform, based on the request included in the first message, the at least one task. The node may be configured to determine that a time of performance of the at least one task by the node is within the particular time window. The node may be configured to generate, based on performing the at least one task and determining that the time of performance of the at least one task by the node is within the particular time window, and by using the key, information associated with performance of the at least one task by the node. The node may be configured to send, to the other node, a fourth message that includes the information associated with performance of the at least one task by the node and information indicating the time of performance of the at least one task by the node.

DETAILED DESCRIPTION

Figure 1A:
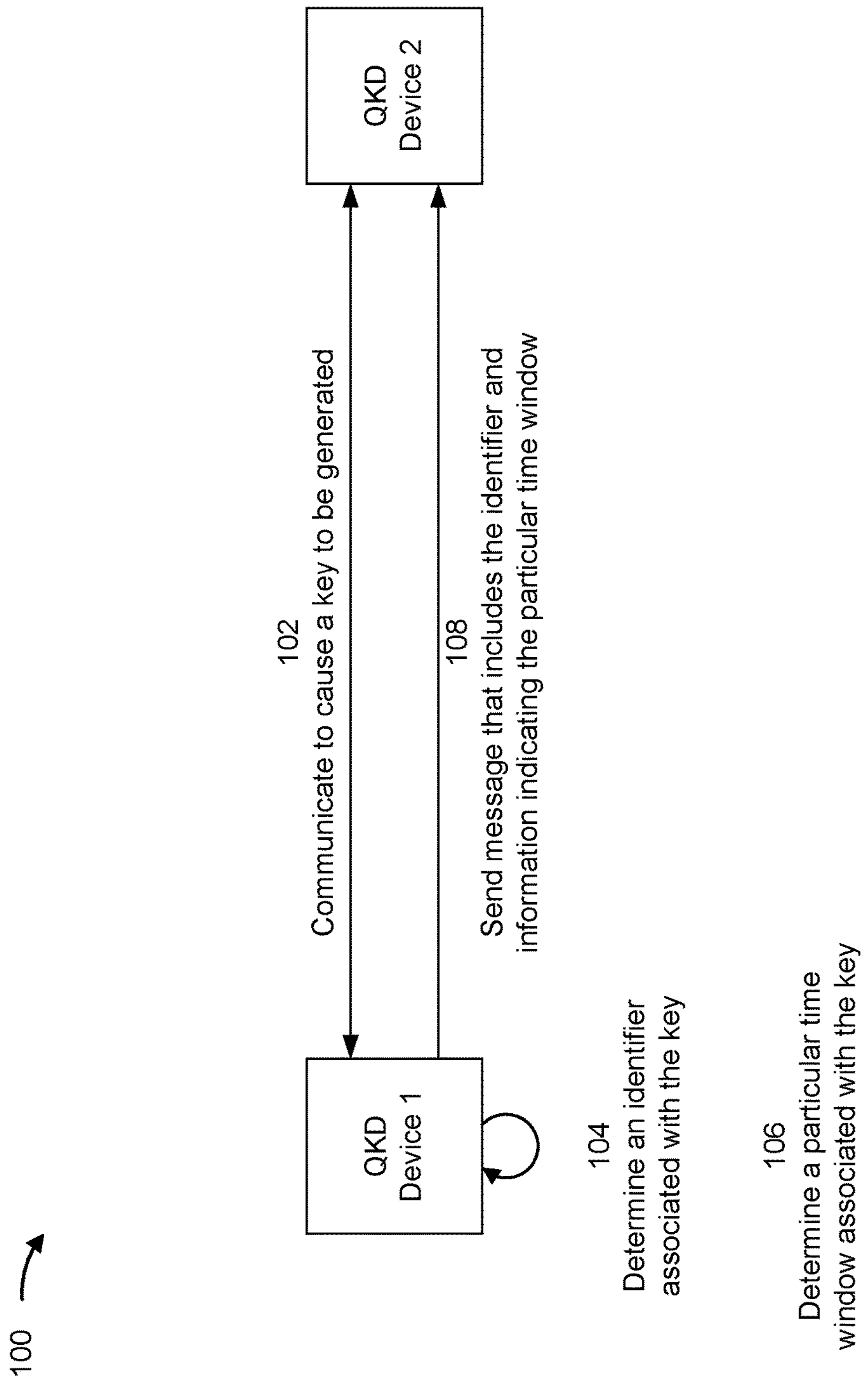
FIGS. 1A-1F are diagrams of an example implementation associated with delayed quantum key-distribution described herein.

The following detailed description of example implementations refers to the accompanying drawings. The same reference numbers in different drawings may identify the same or similar elements.

To ensure security of communication between computing devices, typical cryptographic schemes rely on mathematics-based algorithms. However, mathematics-based algorithms can consume significant computing resources (e.g., processing resources, memory resources, communication resources, and/or power resources, among other examples) and, with the increasing capabilities of quantum computers, data encrypted using such algorithms are vulnerable to attack. In some cases, a physics-based algorithm, such as a quantum key-distribution (QKD) scheme, can be used to more securely distribute keys for encrypting and decrypting data. However, generating the keys can be resource expensive.

Some implementations described herein provide delayed quantum key-distribution. A pair of QKD devices may communicate to generate a key, and a first QKD device, of the pair of the QKD devices, may be configured to delay revealing the key until expiration of a particular time window (e.g., a 5 minute window, a 12 hour window, or a 7 day window, among other examples). The first QKD device may notify one or more verification nodes that the key has been generated, but may provide only an identifier (e.g., an alphanumeric text string) associated with the key to the one or more verification nodes. A control node may request that a task node perform at least one task (e.g., a computation task) and/or may share the identifier with the task node. The task node may communicate (e.g., based on the identifier) with the second QKD device of the pair of the QKD devices to obtain the key for the particular time window. In this way, the key is only available to the pair of QKD devices and the task node (and not the one or more verification nodes) during the particular time window.

The task node may perform the at least one task within the particular time window and may use the key to generate information associated with performance of the at least one task by the task node (e.g., to encrypt or to sign data associated with performance of the at least one task by the task node). The task node may send a message that includes the information to the control node and/or the one or more verification nodes, which may postpone any processing of the message until expiration of the particular time window. The first QKD device then may determine that the particular time window has expired and may provide the key to each of the control node and/or the one or more verification nodes. Each node, of the control node and/or the one or more verification nodes that received the message from the task node, may use the key to determine whether the message from the task node is valid (e.g., by decrypting or verifying the information associated with performance of the at least one task by the task node). Accordingly, a particular node, of the control node and/or the one or more verification nodes that received the message from the task node, then may cause one or more actions to be performed, such as causing a data structure to include at least one entry associated with performance of the at least one task by the task node (e.g., when the message is determined to be valid), or causing a data structure to not include any entry associated with performance of the at least one task by the task node (e.g., when the message is determined to not be valid).

In this way, the key is only available to need-to-know devices, such as the QKD devices and the task node, during the particular time window. Additionally, the first QKD device communicates with the control node and/or the one or more verification nodes and the second QKD device communicates with the task node, which prevents cross communication between the QKD devices and nodes. Further, in some implementations, the first QKD device only sends keys to the control node and/or the one or more verification nodes and therefore is protected from receiving information from the control node and/or the one or more verification nodes that may endanger a functionality of the first QKD device. Accordingly, when the control node and/or the one or more verification nodes obtain the key, after expiration of the particular time window, the control node and/or the one or more verification nodes have a high confidence that any messages sent by the task node and that are associated with performance of tasks during the particular time window by the task node can be verified using the key. This increases a likelihood that the control node and/or a verification node correctly determines that a message is valid (e.g., not fraudulent, spoofed, or otherwise invalid) or invalid, which increases a likelihood that a data structure associated with the control node and/or the verification node is accurately maintained. Further, some implementations allow for multiple uses of a key (rather than a single use) during the particular time window, which conserves computing resources (e.g., processing resources, memory resources, communication resources, and/or power resources, among other examples) that would otherwise be needed for generating, securing, maintaining, and/providing multiple single-use keys during the particular time window.

FIGS. 1A-1F are diagrams of an example implementation 100 associated with delayed quantum key-distribution. As shown in FIGS. 1A-1F, example implementation 100 includes a pair of QKD devices (shown as QKD device 1 and QKD device 2), a control node, one or more validation nodes (shown as validation nodes 1 through N, where N≥1), and/or a task node. These devices are described in more detail below in connection with FIGS. 2-4.

As shown in FIG. 1A, and by reference number 102, the QKD device 1 and the QKD device 2 may communicate to cause a key to be generated. For example, the QKD device 1 and the QKD device 2 may be connected via a quantum channel (e.g., an optical channel that allows quantum states to be transmitted) and a public channel (e.g., a channel associated with a conventional network, such as the Internet or a wireless network). The QKD device 1 and the QKD device 2 then may communicate with each other via the quantum channel and the public channel using a QKD protocol (e.g., a BB 84 protocol, an E91 protocol, or an entangled pair generation protocol, among other examples) to cause a key to be generated. In this way, the QKD device 1 and the QKD device 2 may cause a key to be generated that is known only to the QKD device 1 and the QKD device 2 at a time of generation of the key.

As shown by reference number 104, the QKD device 1 may determine an identifier associated with the key. For example, the QKD device 1 may generate an identifier (e.g., a unique identifier (UID)) associated with the key and may store the key and the identifier in an entry of a data structure associated with the QKD device 1 (e.g., a database, a table, or a file included in the QKD device 1 and/or accessible to the QKD device 1). The identifier may be generated based on the key. For example, the identifier may be a hash of the key or may be the time of generation of the key. The identifier may be used to find and identify the key (e.g., as an index of the entry in the data structure).

As shown by reference number 106, the QKD device 1 may determine a particular time window associated with the key. The particular time window may indicate a start time and an end time of the particular time window. The key may be valid (e.g., to encrypt and/or sign data, as described elsewhere herein) when a time of use of the key is within the particular time window (e.g., the time of use occurs between the start time and the end time). The particular time window expires after the end time of the particular time window (and, therefore, the key ceases to be valid after the particular time window expires). The particular time window may be on the order of seconds, minutes, hours, days, weeks, or months, among other examples. For example, the QKD device 1 may determine a particular time window (e.g., 5 minutes between the start time and the end time of the particular time window) associated with the key. The particular time window may occur immediately (e.g., the start time of the particular time window may be a time of generation of the particular time window) or in the future (e.g., the start time of the particular time window may occur after the time of generation of the particular time window). The QKD device 1 may store information indicating the particular time window in the entry of the data structure associated with the QKD device 1 (e.g., with the key and the identifier).

As further shown in FIG. 1A, and by reference number 108, the QKD device 1 may send a message that includes the identifier and/or the information indicating the particular time window to the QKD device 2. For example, the QKD device 1 may send the message to the QKD device 2 via the public channel between the QKD device 1 and the QKD device 2 (e.g., as a unicast, a multicast, or a broadcast transmission). In some implementations, the QKD device 2 may determine the identifier and/or the information indicating the particular time window without the QKD device 1 sending a message to the QKD device 2. For example, the QKD device 2 may perform a hash of the key to determine the identifier and/or may be pre-configured to associate the key with the particular time window. The QKD device 2 may store the key, the identifier, and/or the information indicating the particular time window in an entry of a data structure of the QKD device 2 (e.g., a database, a table, or a file included in the QKD device 2 and/or accessible to the QKD device 2). The identifier may be used to find and identify the key and/or the information indicating the particular time window (e.g., as an index of the entry in the data structure).

Figure 1B:
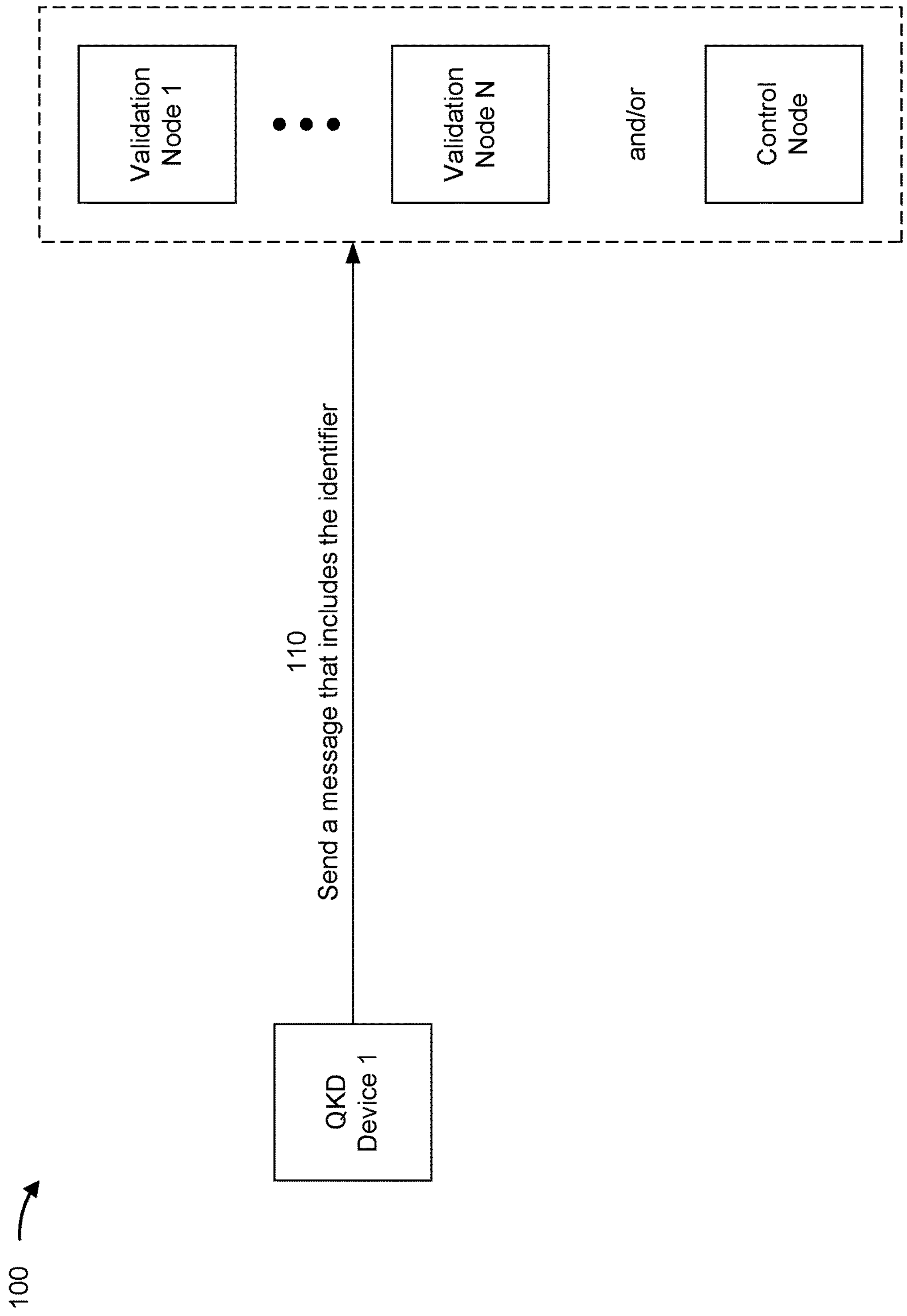

In some implementations, the QKD device 1 may be connected to the control node and/or the one or more validation nodes (e.g., via one or more public or private channels). As shown in FIG. 1B, and by reference number 110, the QKD device 1 may send a message that includes the identifier associated with the key to the control node and/or the one or more validation nodes (e.g., via the one or more public or private channels). For example, the QKD device 1 may send the message to each of the control node and/or the one or more validation nodes (e.g., as a broadcast message to each of the control node and/or the one or more validation nodes 1 through N). As another example, the control node may send a message to the QKD device 1 (e.g., via a public or private channel) that includes a request for the identifier associated with the key, and the QKD device 1 may send a message (e.g., based on the request included in the message sent by the particular validation node) that includes the identifier associated with the key to the control node (e.g., via the public or private channel). In this way (e.g., as described in both examples), the QKD device 1 may send a message that includes the identifier associated with the key to the control node.

In some implementations, the QKD device 1 may send a message that includes the identifier associated with the key to the one or more validation nodes before expiration of the particular time window. For example, the QKD device 1 may send the message to the control node and/or the one or more validation nodes before the end time of the particular time window. As another example, the QKD device 1 may send the message to the control node and/or the one or more validation nodes before the start time of the particular time window.

Figure 1C:
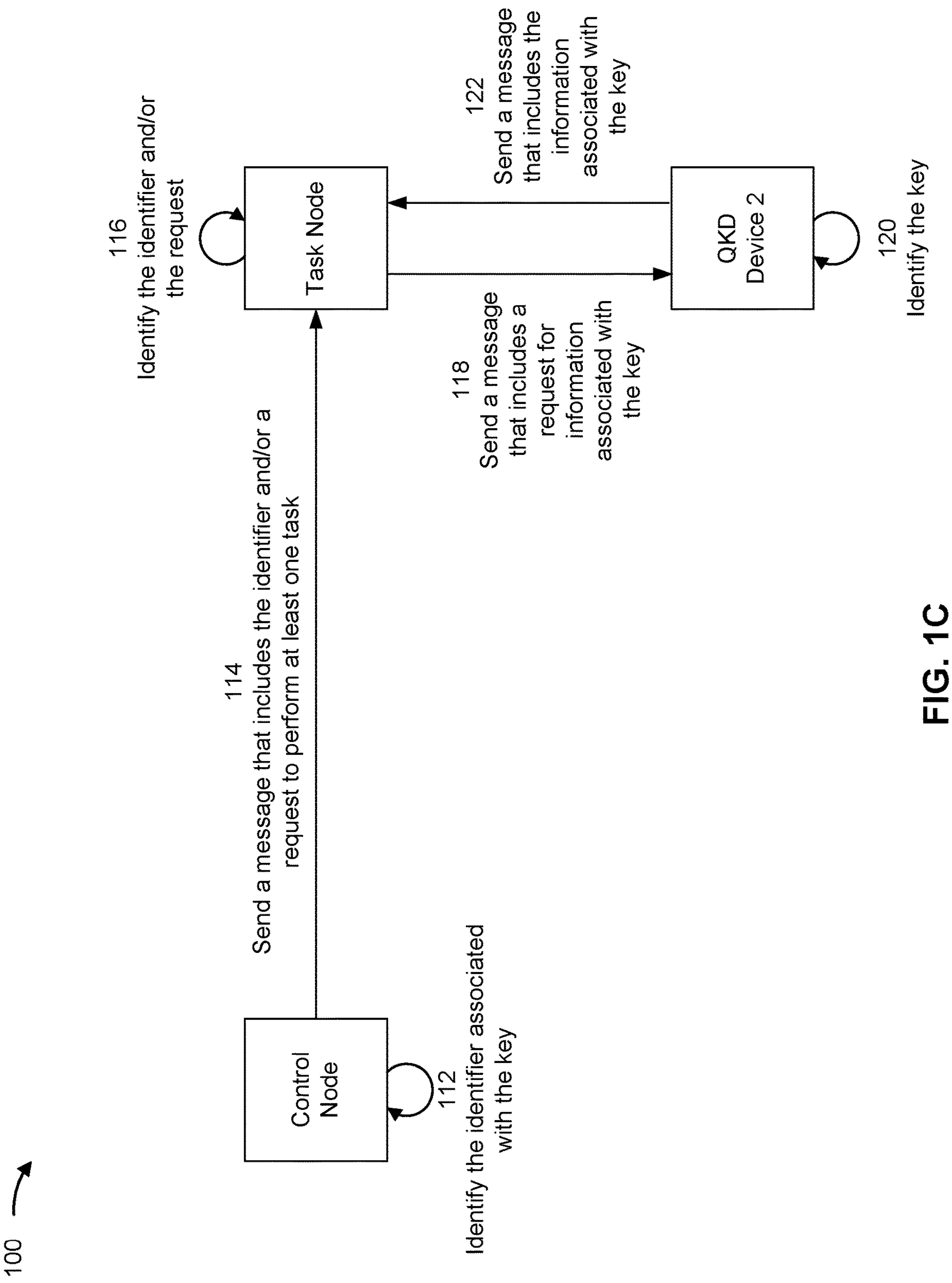

As shown in FIG. 1C, and by reference number 112, the control node may identify the identifier associated with the key. For example, the particular validation node may process (e.g., parse) a message received from the QKD device 1 that includes the identifier associated with the key (e.g., as described herein in relation to FIG. 1B and reference number 110) to identify the identifier.

In some implementations, the control node may be a "task requisition" node. That is, the control node may be configured to request another node, such as the task node, to perform at least one task. The at least one task may include, for example, performing at least one action (e.g., receiving, processing, storing, routing, and/or providing data) and updating a data structure to include at least one entry associated with the at least one action (e.g., as a record of performance of the at least one action). Accordingly, as shown in FIG. 1C, and by reference number 114, the control node may send a message to the task node that includes a request to perform at least one task. Additionally, or alternatively, the message may include the identifier associated with the key.

As further shown in FIG. 1C, and by reference number 116, the task node may identify the identifier associated with the key and/or the request to perform the at least one task. For example, the task node may process (e.g., parse) the message received from the particular validation node that includes the identifier associated with the key and/or the request to perform the at least one task (e.g., as described herein in relation to reference number 114) to identify the identifier associated with the key and/or the request to perform the at least one task.

In some implementations, the task node may be connected to the QKD device 2 (e.g., via a public or private channel). As shown by reference number 118, the task node may send a message to the QKD device 2 (e.g., via the public or private channel). For example, when the task node has identified the identifier associated with the key, the message may include the identifier associated with the key and/or a request for information associated with the key to the QKD device 2. As another example, when the task node has not identified the identifier associated with the key (e.g., because the message received from the control node only included the request to perform the at least one task), the message may include just a request for information associated with the key (e.g., a request for information associated with an active key). The request for information associated with the key may include key acceptability criteria, such as criteria associated with a time window length, a time window start time, a time window end time, an identifier bit pattern, and/or a key bit pattern, among other examples.

The QKD device 2 may process (e.g., parse) the message to identify the identifier associated with the key and/or the request for information associated with the key. Accordingly, as shown by reference number 120, the QKD device 2 may identify the key. For example, the QKD device 2 may search, based on the identifier associated with the key, the data structure associated with the QKD device 2 to identify an entry that includes the identifier associated with the key, the key, and the information that indicates the particular time window associated with the key. As another example, the QKD device 2 may search, based on the key acceptability criteria included in the request for information associated with the key, the data structure associated with the QKD device 2 to identify an entry associated with a key that satisfies the key acceptability criteria, such as the entry that includes the identifier associated with the key, the key, and the information that indicates the particular time window associated with the key.

As shown by reference number 122, the QKD device 2 may send a message that includes the information associated with the key to the task node (e.g., via the public or private channel between the task node and the QKD device 2). The information associated with the key may include the key, the information that indicates the particular time window associated with the key, key derivation information (e.g., information that is cryptographically derived from the key, such as by encrypting the key), and/or other key-related information.

Figure 1D:
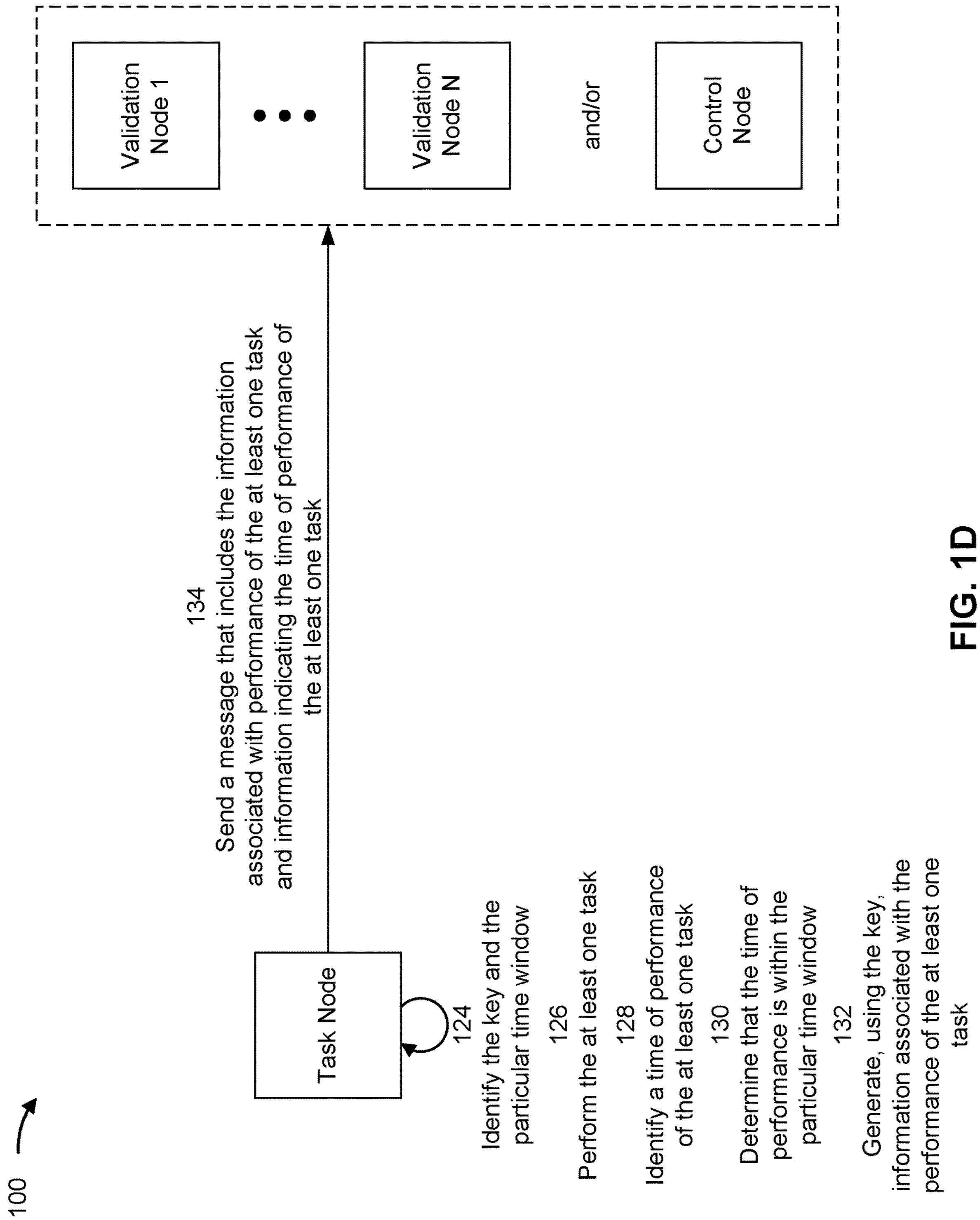

As shown in FIG. 1D, and by reference number 124, the task node may identify the key and/or the particular time window. For example, the task node may process (e.g., parse) the message received from the QKD device 2 that includes the key and the information that indicates the particular time window associated with the key (e.g., as described herein in relation to FIG. 1C and reference number 122) to identify the key and the particular time window. In another example, the task node may identify the key derivation information included in the message and may process the key derivation information (e.g., may decrypt the key derivation information) to identify the key.

As further shown in FIG. 1D, and by reference number 126, the task node may perform the at least one task (e.g., based on the request included in the message that was received from the particular validation node, as described herein in relation to FIG. 1C and reference number 114). As shown by reference number 128, the task node may identify a time of performance of the at least one task by the task node. For example, the task node may identify the time of performance of the at least one task by the task node as a completion time of performing the at least one action and/or updating the data structure included in the at least one task node.

As further shown in FIG. 1D, and by reference number 130, the task node may determine that the time of performance of the at least one task by the task node is within the particular time window. For example, the task node may determine that the time of performance of the at least one task by the task node is after or equal to the start time and before or equal to the end time of the particular time window. Accordingly, as shown by reference number 132, the task node may generate (e.g., by using the key) information associated with the performance of the at least one task by the task node. For example, the task node may generate data (e.g., "proof-of-stake" data and/or data indicating the time of performance of the at least one task by the task node) based on performing the at least one task and may encrypt the data using the key. In this way, the encrypted data is the information associated with performance of the at least one task by the task node. As another example, the task node may generate the data based on performing the at least one task and may generate a signature using the key and based on the data. In this way, the data and the signature are the information associated with performance of the at least one task by the task node.

In some implementations, the task node may be connected to the control node and/or the one or more validation nodes (e.g., via one or more public channels). As shown in FIG. 1D, and by reference number 134, the task node may send a message that includes the information associated with performance of the at least one task by the task node and information indicating the time of performance of the at least one task by the task node to a set of nodes that comprises at least one of the control node and/or the one or more validation nodes (e.g., via the one or more public channels). For example, the task node may send the message to each of the control node and/or the one or more validation nodes (e.g., as a broadcast message and/or a multicast message to each of the control node and/or the one or more validation nodes 1 through N). As another example, the task node may send the message to the control node (e.g., as a unicast message, such as because the control node requested performance of the at least one task, as described herein in relation to FIG. 1C and reference number 114). In each example, the message may be relayed to an intended target node (e.g., one or more nodes may route the message to the target node).

Figure 1E:
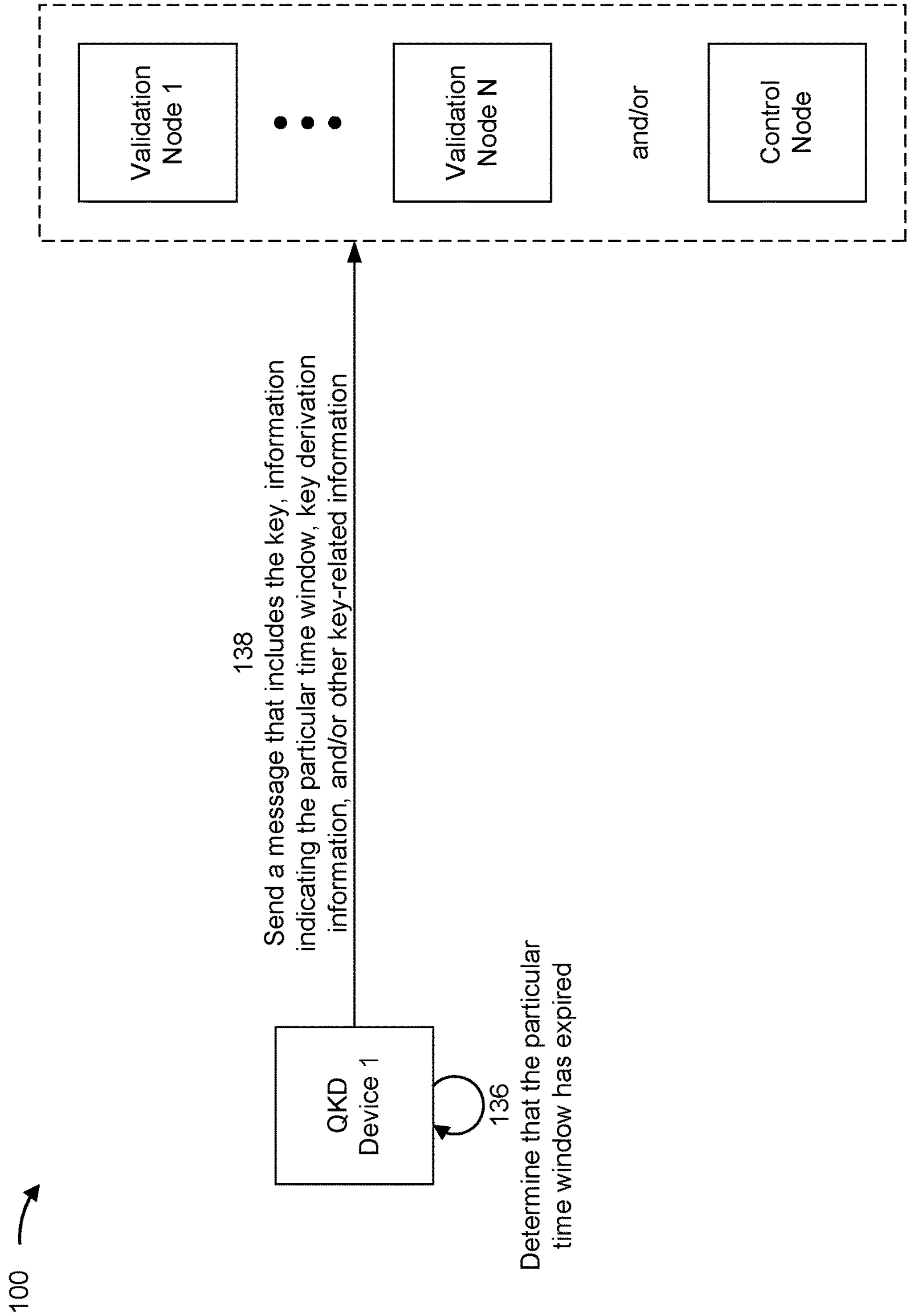

As shown by FIG. 1E, and by reference number 136, the QKD device 1 may determine that the particular time window has expired. For example, the QKD device 1 may determine that a current time is after the end time of the particular time window. Accordingly, as shown by reference number 138, the QKD device 1 may send a message that includes the key, the identifier associated with the key, the information indicating the particular time, key derivation information (e.g., information that is cryptographically derived from the key, such as by encrypting the key), and/or other key-related information to the control node and/or the one or more validation nodes (e.g., via the one or more public channels between the QKD device 1 and the one or more validation nodes). For example, the QKD device 1 may send the message to each of the control node and/or the one or more validation nodes (e.g., as a broadcast message to each of the one or more validation nodes 1 through N). In another example, the QKD device 1 may send the message to each of the set of nodes that received the message from the task node (e.g., that includes the information associated with performance of the at least one task by the task node and the information indicating the time of performance of the at least one task by the task node, as described herein in relation to FIG. 1D and reference number 134). As another example, the QKD device 1 may send the message to just the control node. In this way, the QKD device 1 may send a message that includes the key, the identifier associated with the key, the information indicating the particular time window, the key derivation information, and/or the other key-related information to the control node and/or the one or more validation nodes after expiration of the particular time window.

Figure 1F:
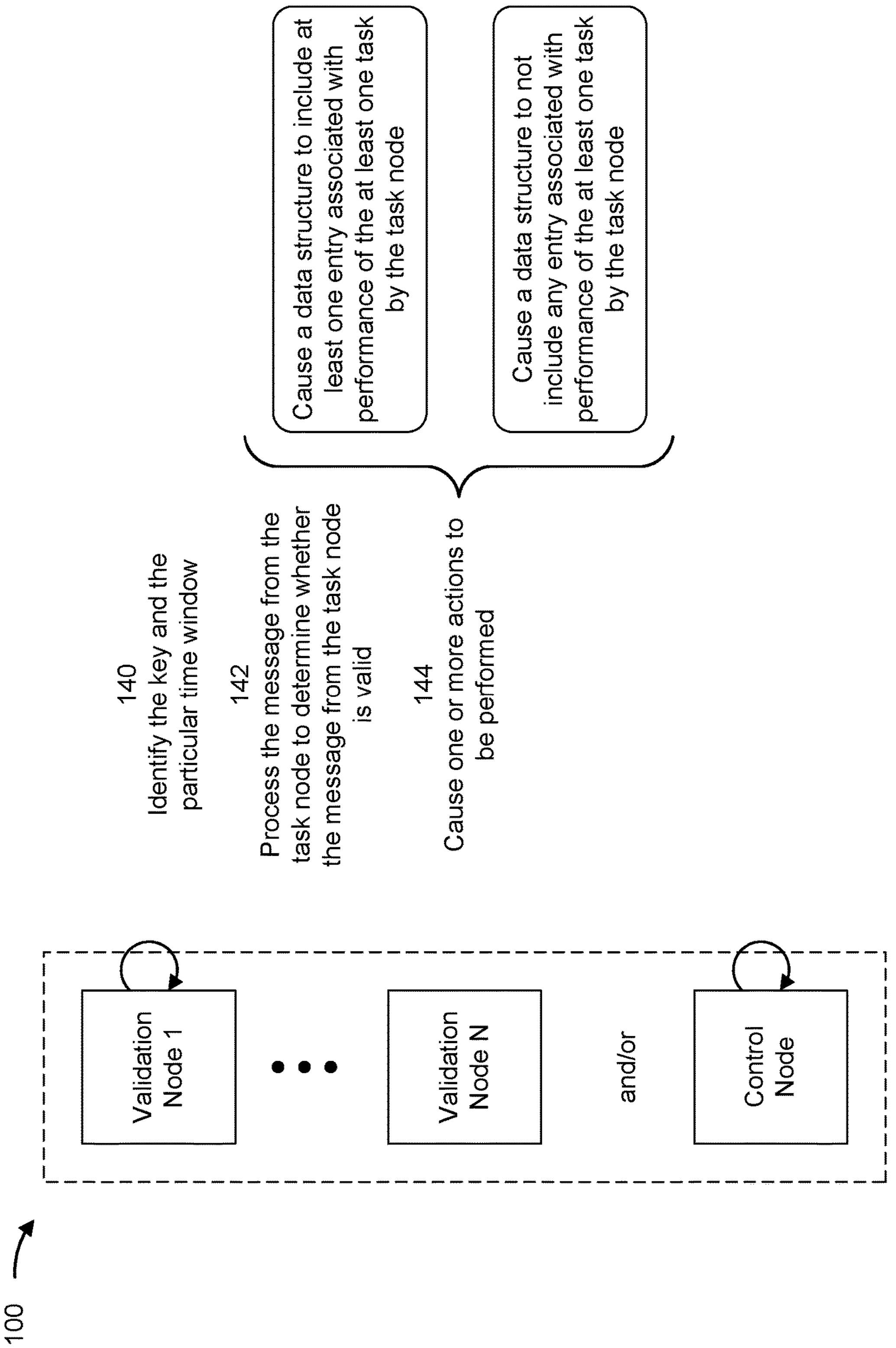

As shown in FIG. 1F, and by reference number 140, a particular node, of the set of nodes that received the message from the task node, such as the control node, may identify the key and the particular time window. For example, the particular node may process (e.g., parse) the message received from the QKD device 1 that includes the key, the identifier associated with the key, the information indicating the particular time window, the key derivation information, and/or the other key-related information (e.g., as described herein in relation to FIG. 1E and reference number 138) to identify the key, the identifier associated with the key, the information indicating the particular time window, the key derivation information, and/or the other key-related information. In another example, the particular node may identify the key derivation information included in the message and may process the key derivation information (e.g., may decrypt the key derivation information) to identify the key.

As shown by reference number 142, the particular node may process the message from the task node (e.g., that includes the information associated with performance of the at least one task by the task node and the information indicating the time of performance of the at least one task by the task node, as described herein in relation to FIG. 1D and reference number 134) to determine whether the message from the task node is valid. For example, the particular node may process (e.g., parse) the message from the task node to identify the time of performance of the at least one task by the task node. The particular node may determine that the time of performance of the at least one task by the task node occurred after expiration of the particular time window, and, accordingly, may determine that the message from the task node is not valid (e.g., because the at least one task was not performed within the particular time window). Additionally, or alternatively, the particular node may determine that the time of performance of the at least one task by the task node occurred after a time of reception of the message from the task node, and, accordingly, may determine that the message from the task node is not valid (e.g., because of a time discrepancy associated with the message).

As another example, the particular node may process (e.g., parse) the message from the task node to identify the time of performance of the at least one task by the task node and the information associated with performance of the at least one task by the task node. The particular node may determine that the time of performance of the at least one task by the task node occurred within the particular time window. Accordingly, the particular node may process (e.g., decrypt or validate), using the key, the information associated with performance of the at least one task by the task node to determine that the task node used the key to generate the information associated with performance of the at least one task by the task node and may thereby determine that the message from the task node is valid. Alternatively, the particular node may process, using the key, the information associated with performance of the at least one task by the task node to determine that the task node did not use the key to generate the information associated with performance of the at least one task by the task node and may thereby determine that the message from the task node is not valid.

As further shown in FIG. 1F, and by reference number 144, the particular node may cause one or more actions to be performed. For example, when the message from the task node is determined to be valid (e.g., as described in relation to reference number 142), the particular node may cause a data structure associated with the particular node (e.g., a database, a table, or a file included in the particular node and/or accessible to the particular node) to include at least one entry associated with performance of the at least one task by the task node (e.g., add the at least one entry to the data structure and/or commit the at least one entry to the data structure). The at least one entry may include, for example, the information associated with performance of the at least one task by the task node, the information indicating the time of performance of the at least one task by the task node, the key, and/or the information indicating the particular time window. As another example, when the message from the task node is determined to be not valid (e.g., as described in relation to reference number 142), the particular node may cause the data structure to not include any entry associated with performance of the at least one task by the task node. Accordingly, the particular node may prevent any entry associated with performance of the at least one task by the task node from being added to the data structure and/or may delete, discard, or rollback any temporary entry associated with performance of the at least one task by the task node.

As further shown in FIG. 1F, when one or more other nodes, of the set of nodes that received the message from the task node, other than the particular node, receive the message from the task node, each of the one or more other nodes may identify the key and the particular time window (e.g., as described in relation to reference number 140) and each may process the message from the task node to determine whether the message from the task node is valid (e.g., as described in relation to reference number 142). Accordingly, the one or more other nodes may communicate with each other and/or the particular node (e.g., via one or more public channels between the one or more other nodes and/or the particular node) to cause the one or more actions to be performed (e.g., as described in relation to reference number 144). For example, a certain other node (e.g., the validation node 1), of the one or more other nodes, may communicate with at least one of the one or more other nodes and/or the particular node (e.g., the control node) to determine that at least a majority of the one or more other nodes and/or the particular node have determined that the message from the task node is valid. Accordingly, the certain other node (e.g., the validation node 1) may cause a data structure associated with the certain other node to include at least one entry associated with performance of the at least one task by the task node. As another example, the certain other node may communicate with at least one of the one or more other nodes and/or the particular node (e.g., the control node) to determine that at least a majority of the one or more other nodes and/or the particular node have determined that the message from the task node is not valid. Accordingly, the certain other validation node may cause the data structure associated with the certain other validation node to not include any entry associated with performance of the at least one task by the task node.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
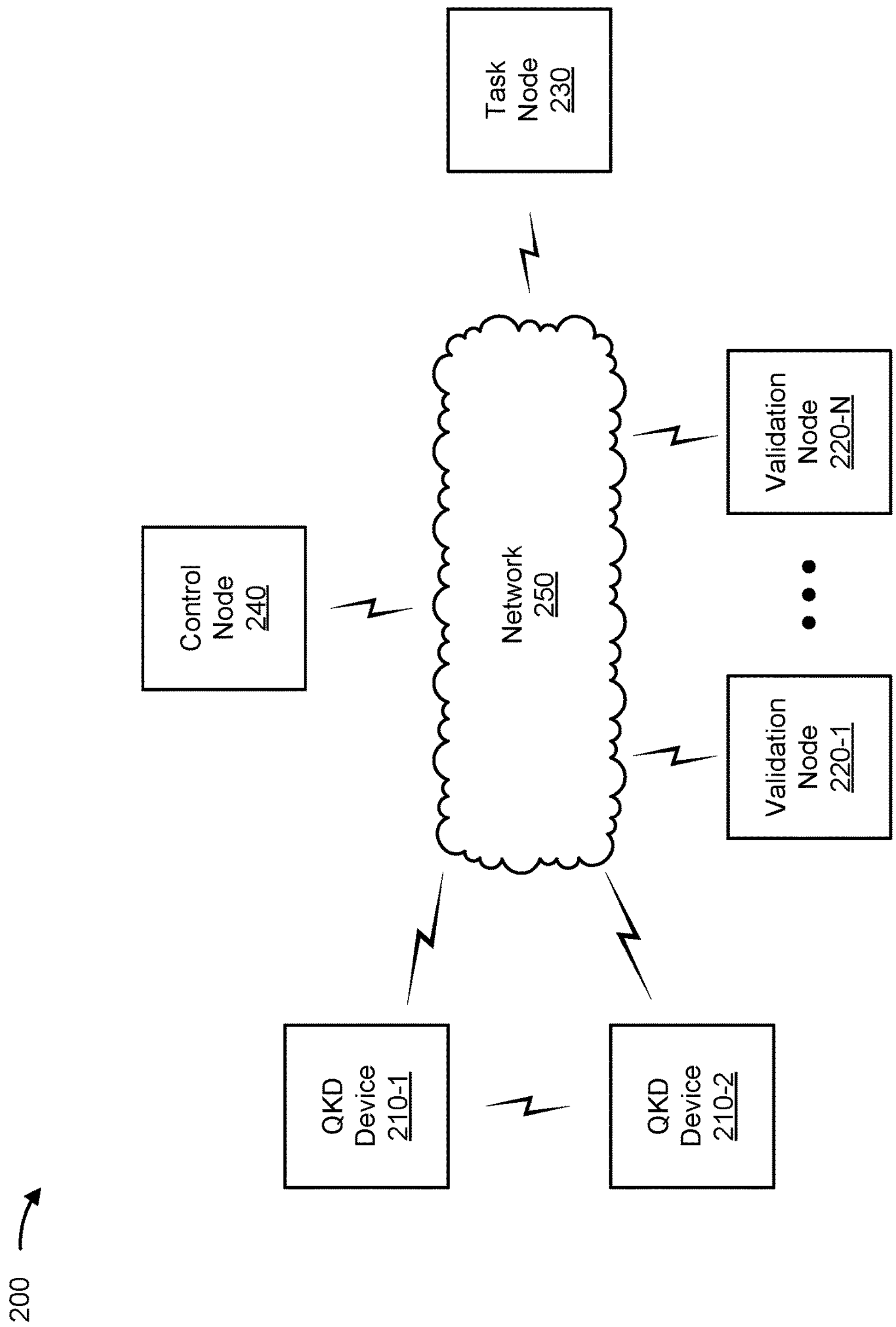
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include two QKD devices 210 (shown as QKD device 210-1 and QKD device 210-2), one or more validation nodes 220 (shown as node 220-1 through node 220-N, where N≥1), a task node 230, a control node 240, and a network 250. Devices of environment 200 may interconnect via wired connections, wireless connections, or a combination of wired and wireless connections.

The QKD device 210 includes one or more devices capable of receiving, generating, storing, processing, providing, and/or routing information associated with delayed quantum key-distribution, as described elsewhere herein. The QKD device 210 may include a communication device and/or a computing device. For example, the QKD device 210 may include a server, such as an application server, a client server, a web server, a database server, a host server, a proxy server, a virtual server (e.g., executing on computing hardware), or a server in a cloud computing system. In some implementations, the QKD device 210 includes computing hardware used in a cloud computing environment. The QKD device 210 may be connected to another QKD device 210, the one or more validation nodes 220, the task node 230, and/or the network 250 via one or more public channels. In some implementations, the QKD device 210 includes a wave plate, a beamsplitter, an electro-optic modulator, a laser transmitter, an optical waveform generator, and/or other components associated with transmission and/or reception of a key. The QKD device 210 may be configured to transmit and/or receive modulated light that includes a multiple number of spatial nodes that are associated with the key. The QKD device 210 may be connected to another QKD device 210 via a quantum channel (e.g., an optical channel that allows quantum states to be transmitted, such as via the modulated light).

The validation node 220 includes one or more devices capable of receiving, generating, storing, processing, providing, and/or routing information associated with validating a message in association with delayed quantum key-distribution. The validation node 220 may include a communication device and/or a computing device. For example, the validation node 220 may include a server, such as an application server, a client server, a web server, a database server, a host server, a proxy server, a virtual server (e.g., executing on computing hardware), or a server in a cloud computing system. As another example, the validation node 220 may include a router, such as a label switching router (LSR), a label edge router (LER), an ingress router, an egress router, a provider router (e.g., a provider edge router or a provider core router), a virtual router, or another type of router. Additionally, or alternatively, the validation node 220 may include a gateway, a switch, a firewall, a hub, a bridge, a reverse proxy, a server (e.g., a proxy server, a cloud server, a data center server, etc.), a load balancer, and/or a similar device. The validation node 220 may be connected to one or more other validation nodes 220, the task node 230, the control node 240, and/or the network 250 via one or more public channels.

The task node 230 includes one or more devices capable of receiving, generating, storing, processing, providing, and/or routing information associated with performing at least one task in association with delayed quantum key-distribution. The task node 230 may include a communication device and/or a computing device. For example, the task node 230 may include a server, such as an application server, a client server, a web server, a database server, a host server, a proxy server, a virtual server (e.g., executing on computing hardware), or a server in a cloud computing system. As another example, the task node 230 may include a router, such as an LSR, an LER, an ingress router, an egress router, a provider router (e.g., a provider edge router or a provider core router), a virtual router, or another type of router. Additionally, or alternatively, the task node 230 may include a gateway, a switch, a firewall, a hub, a bridge, a reverse proxy, a server (e.g., a proxy server, a cloud server, a data center server, etc.), a load balancer, and/or a similar device. The task node 230 may be connected to the one or more validation nodes 220, the control node 240, and/or the network 250 via one or more public channels.

The control node 240 includes one or more devices capable of receiving, generating, storing, processing, providing, and/or routing information associated with requesting performance of at least one task and/or validating a message in association with delayed quantum key-distribution. The control node 240 may include a communication device and/or a computing device. For example, the control node 240 may include a server, such as an application server, a client server, a web server, a database server, a host server, a proxy server, a virtual server (e.g., executing on computing hardware), or a server in a cloud computing system. As another example, the control node 240 may include a router, such as an LSR, an LER, an ingress router, an egress router, a provider router (e.g., a provider edge router or a provider core router), a virtual router, or another type of router. Additionally, or alternatively, the control node 240 may include a gateway, a switch, a firewall, a hub, a bridge, a reverse proxy, a server (e.g., a proxy server, a cloud server, a data center server, etc.), a load balancer, and/or a similar device. The control node 240 may be connected to the one or more validation nodes 220, the task node 230, and/or the network 250 via one or more public channels.

The network 250 includes one or more wired and/or wireless networks. For example, the network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
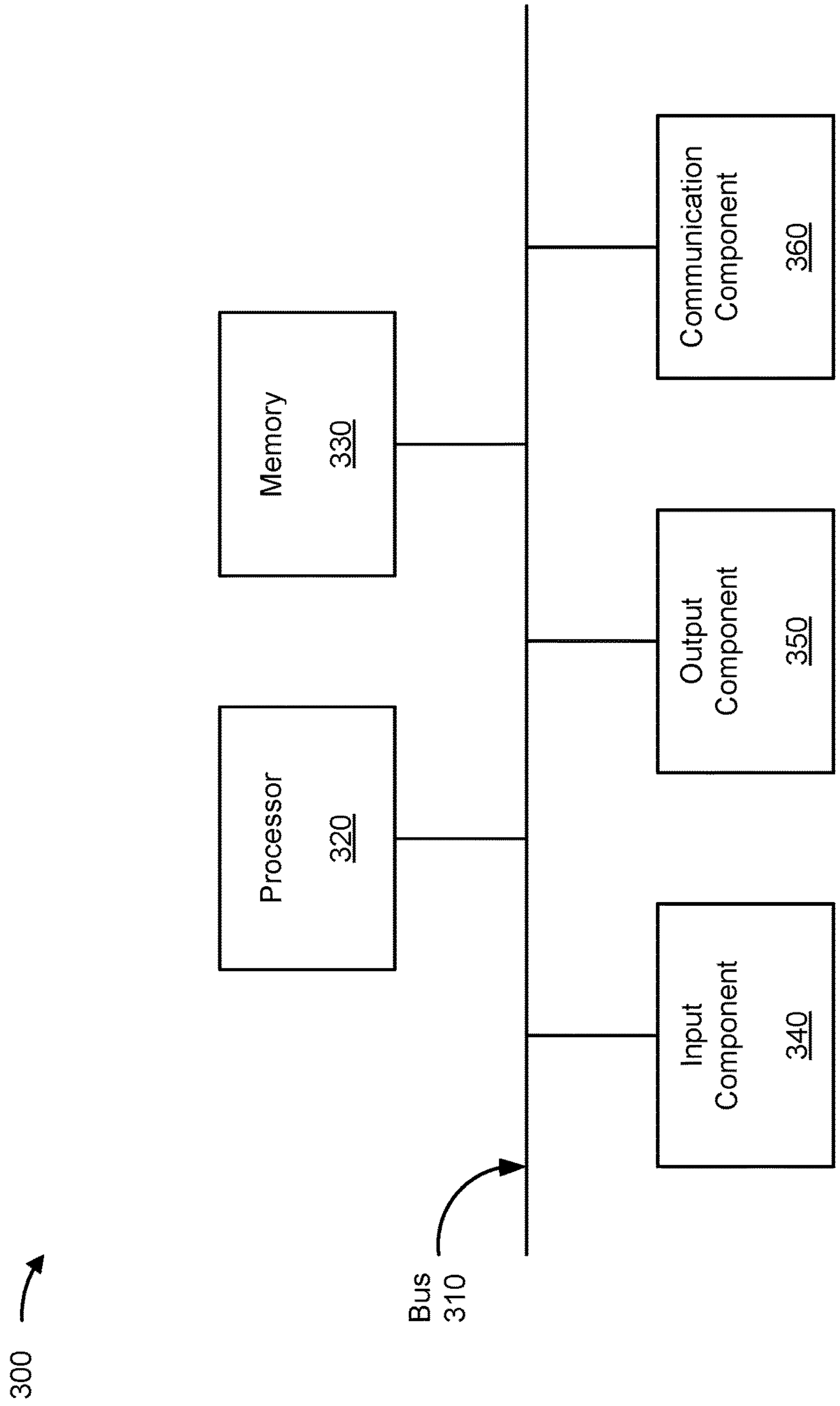
FIGS. 3-4 are diagrams of example components of one or more devices of FIG. 2.

FIG. 3 is a diagram of example components of a device 300, which may correspond to the QKD device 210, the validation node 220, the task node 230, and/or the control node 240. In some implementations, the QKD device 210, the validation node 220, the task node 230, and/or the control node 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
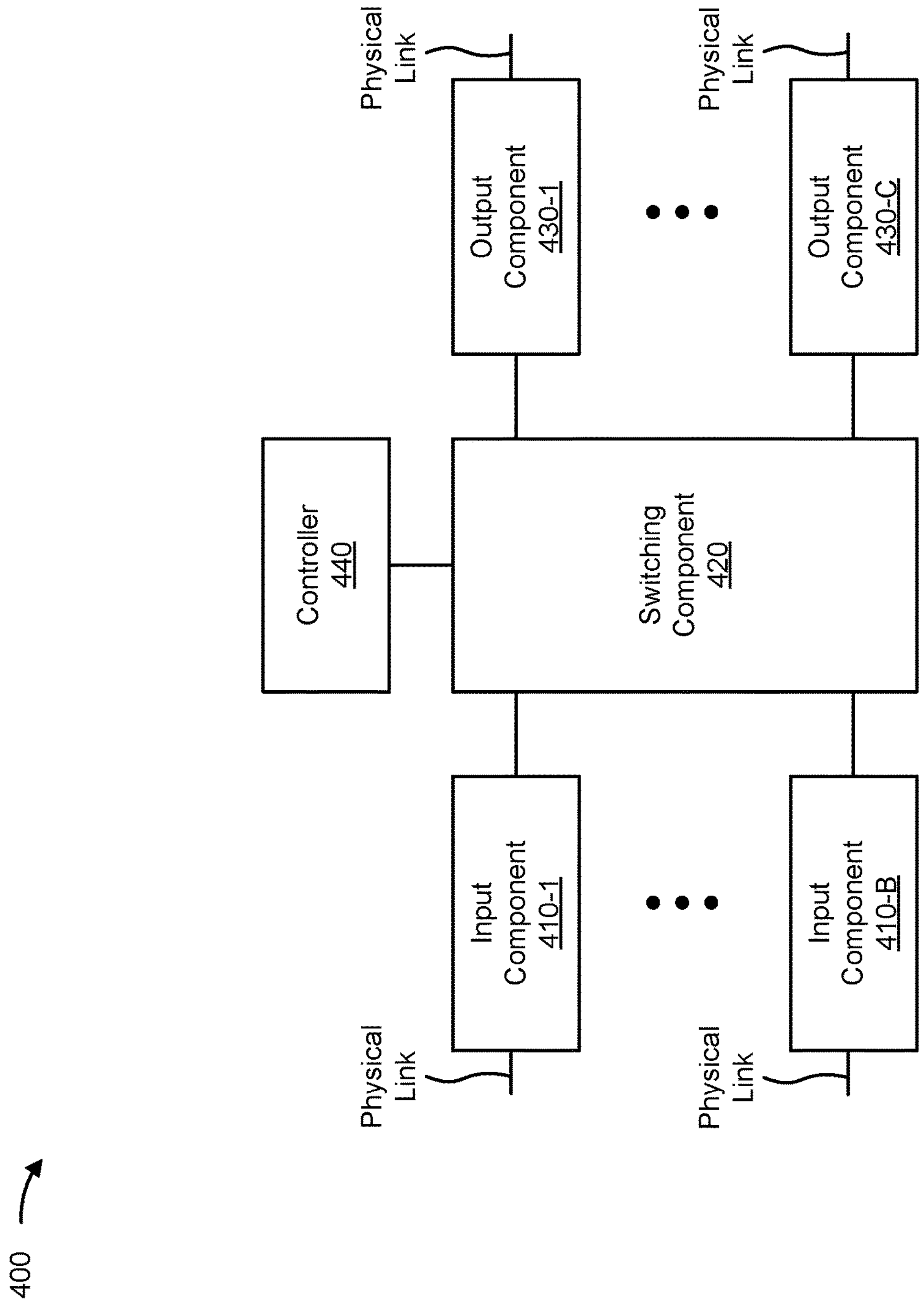

FIG. 4 is a diagram of example components of a device 400. Device 400 may correspond to the QKD device 210, the validation node 220, the task node 230, and/or the control node 240. In some implementations, the QKD device 210, the validation node 220, the task node 230, and/or the control node 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
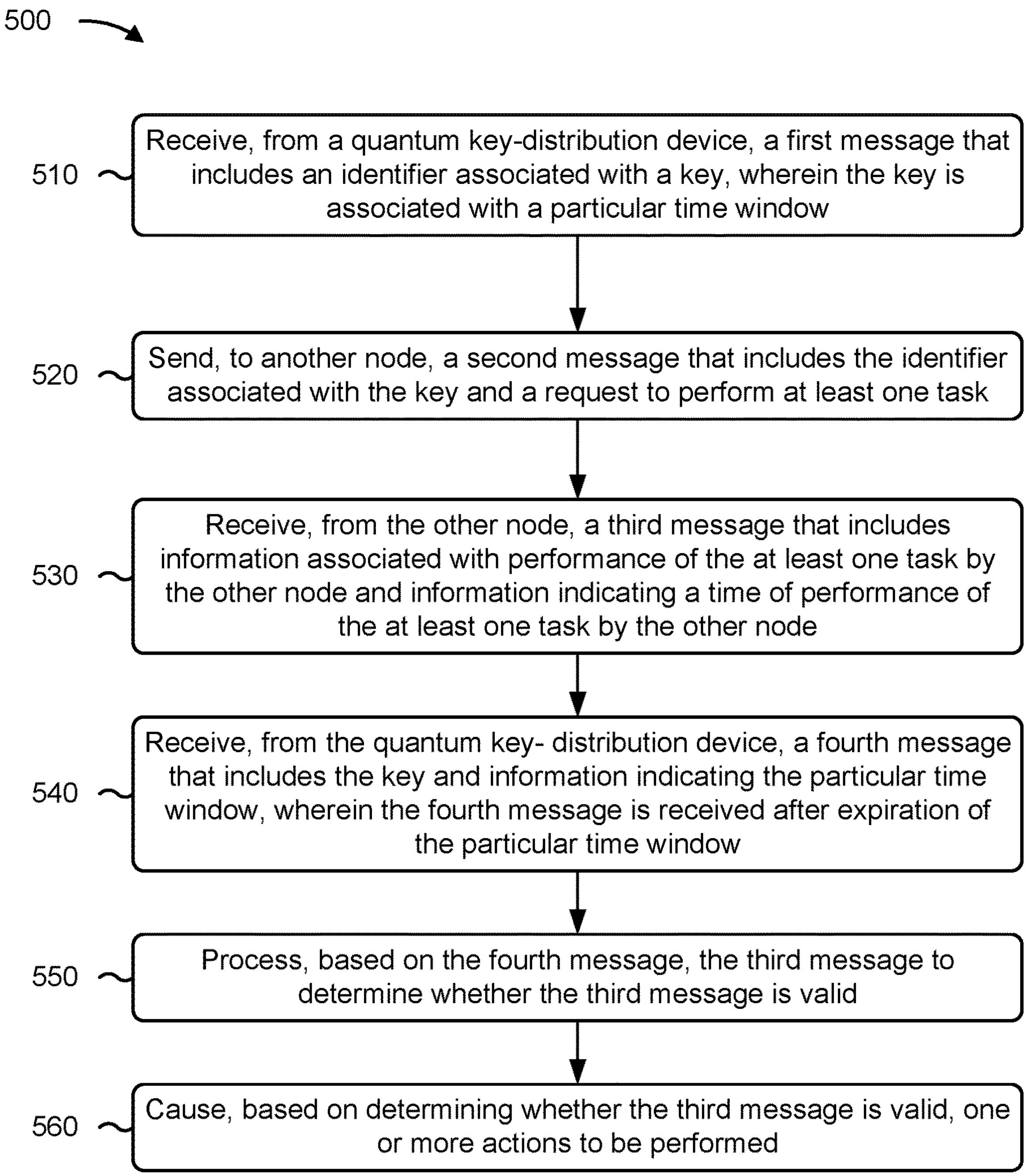
FIGS. 5-7 are flowcharts of example processes associated with delayed quantum key-distribution.

FIG. 5 is a flowchart of an example process 500 associated with delayed quantum key-distribution. In some implementations, one or more process blocks of FIG. 5 are performed by a node (e.g., validation node 220). In some implementations, one or more process blocks of FIG. 5 are performed by another device or a group of devices separate from or including the node, such as a quantum key-distribution device (e.g., QKD device 210) and/or one or more other nodes (e.g., one or more other validation nodes 220 and/or a task node 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; or one or more components of another device.

As shown in FIG. 5, process 500 may include receiving, from a quantum key-distribution device, a first message that includes an identifier associated with a key, wherein the key is associated with a particular time window (block 510). For example, the node may receive, from a quantum key-distribution device, a first message that includes an identifier associated with a key. In some implementations, the key is associated with a particular time window.

As further shown in FIG. 5, process 500 may include sending, to another node, a second message that includes at least one of the identifier associated with the key or a request to perform at least one task (block 520). For example, the node may send, to another node, a second message that includes at least one the identifier associated with the key or a request to perform at least one task, as described above.

As further shown in FIG. 5, process 500 may include receiving, from the other node, a third message that includes information associated with performance of the at least one task by the other node and information indicating a time of performance of the at least one task by the other node (block 530). For example, the node may receive, from the other node, a third message that includes information associated with performance of the at least one task by the other node and information indicating a time of performance of the at least one task by the other node, as described above.

As further shown in FIG. 5, process 500 may include receiving, from the quantum key-distribution device, a fourth message that includes the key and information indicating the particular time window, wherein the fourth message is received after expiration of the particular time window (block 540). For example, the node may receive, from the quantum key-distribution device, a fourth message that includes the key and information indicating the particular time window. In some implementations, the fourth message is received after expiration of the particular time window.

As further shown in FIG. 5, process 500 may include processing, based on the fourth message, the third message to determine whether the third message is valid (block 550). For example, the node may process, based on the fourth message, the third message to determine whether the third message is valid, as described above.

As further shown in FIG. 5, process 500 may include causing, based on determining whether the third message is valid, one or more actions to be performed (block 560). For example, the node may cause, based on determining whether the third message is valid, one or more actions to be performed, as described above.

Process 500 may include additional implementations, such as any single implementation or any combination of implementations described below and/or in connection with one or more other processes described elsewhere herein.

In a first implementation, processing the third message to determine whether the third message is valid comprises processing the third message to identify the time of performance of the at least one task by the other node, processing the fourth message to identify the particular time window, determining that the time of performance of the at least one task by the other node occurred after expiration of the particular time window, and determining, based on determining that the time of performance of the at least one task by the other node occurred after expiration of the particular time window, that the third message is not valid.

In a second implementation, alone or in combination with the first implementation, processing the third message to determine whether the third message is valid comprises processing the third message to identify the time of performance of the at least one task by the other node and the information associated with performance of the at least one task by the other node, processing the fourth message to identify the particular time window and the key, determining that the time of performance of the at least one task by the other node occurred within the particular time window, processing, using the key, the information associated with performance of the at least one task by the other node to determine that the other node used the key to generate the information associated with performance of the at least one task by the other node, and determining, based on determining that the time of performance of the at least one task by the other node occurred within the particular time window and determining that the other node used the key to generate the information associated with performance of the at least one task by the other node, that the third message is valid.

In a third implementation, alone or in combination with one or more of the first and second implementations, processing the third message to determine whether the third message is valid comprises processing the third message to identify the time of performance of the at least one task by the other node and the information associated with performance of the at least one task by the other node, processing the fourth message to identify the particular time window and the key, determining that the time of performance of the at least one task by the other node occurred within the particular time window, processing, using the key, the information associated with performance of the at least one task by the other node to determine that the other node did not use the key to generate the information associated with performance of the at least one task by the other node, and determining, based on determining that the time of performance of the at least one task by the other node occurred within the particular time window and determining that the other node did not use the key to generate the information associated with performance of the at least one task by the other node, that the third message is not valid.

In a fourth implementation, alone or in combination with one or more of the first through third implementations, the information associated with performance of the at least one task by the other node comprises at least one of information that is generated by the other node, in association with performance of the at least one task by the other node, and that is encrypted by the other node using the key, or a signature that is generated by the other node, in association with performance of the at least one task by the other node, using the key.

In a fifth implementation, alone or in combination with one or more of the first through fourth implementations, sending the second message to the other node causes the other node to obtain the key from another quantum key-distribution device.

In a sixth implementation, alone or in combination with one or more of the first through fifth implementations, sending the second message to the other node causes the other node to obtain the key from another quantum key-distribution device, and generate, based on the key, the information associated with performance of the at least one task by the other node.

In a seventh implementation, alone or in combination with one or more of the first through sixth implementations, the third message is determined to be valid, and causing the one or more actions to be performed comprises causing a data structure to include at least one entry associated with performance of the at least one task by the other node.

In an eighth implementation, alone or in combination with one or more of the first through seventh implementations, the third message is determined to be not valid, and causing the one or more actions to be performed comprises causing a data structure to not include any entry associated with performance of the at least one task by the other node.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
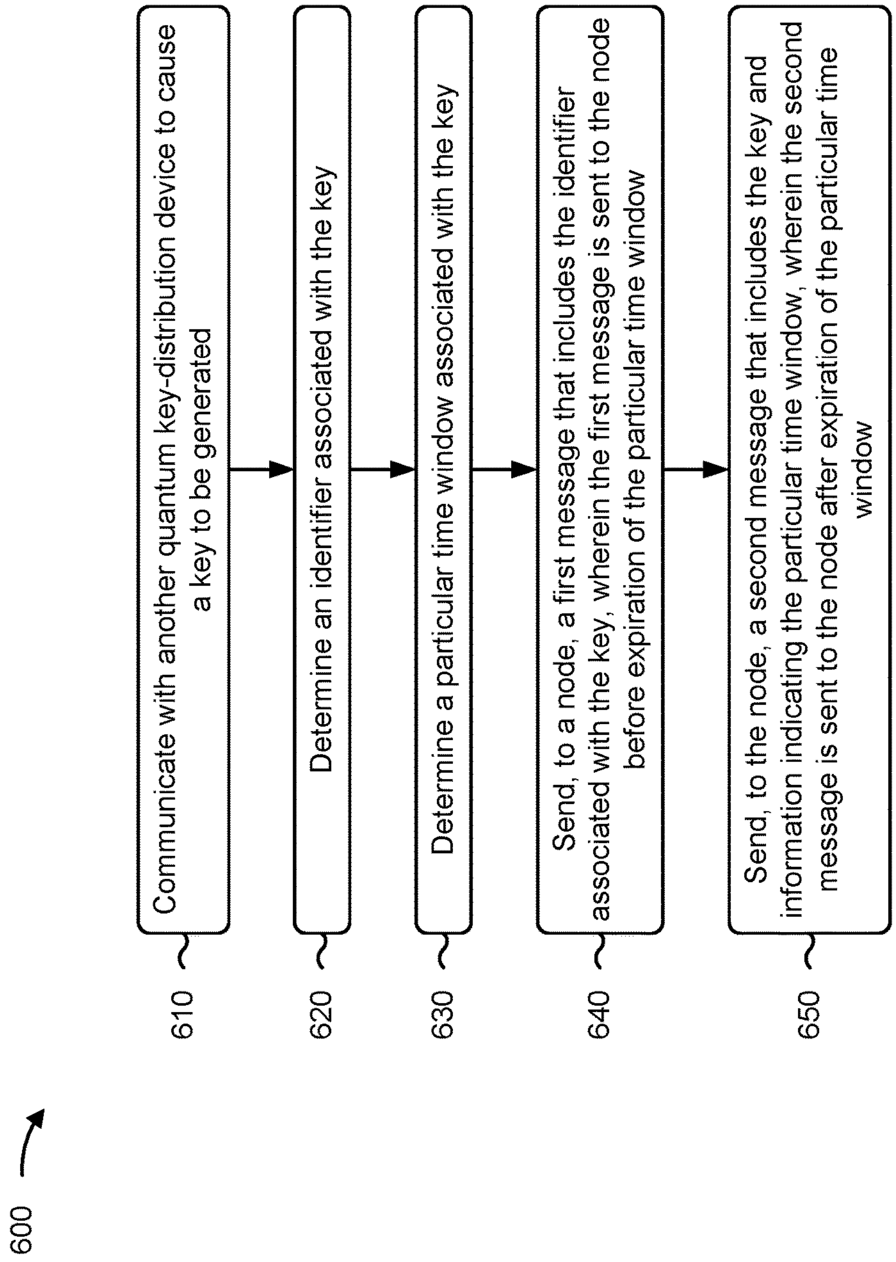

FIG. 6 is a flowchart of an example process 600 associated with delayed quantum key-distribution. In some implementations, one or more process blocks of FIG. 6 are performed by a quantum key-distribution device (e.g., QKD device 210). In some implementations, one or more process blocks of FIG. 6 are performed by another device or a group of devices separate from or including the quantum key-distribution device, such as one or more nodes (e.g., one or more validation nodes 220 and/or a task node 230). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; or one or more components of another device.

As shown in FIG. 6, process 600 may include communicating with another quantum key-distribution device to cause a key to be generated (block 610). For example, the quantum key-distribution device may communicate with another quantum key-distribution device to cause a key to be generated, as described above.

As further shown in FIG. 6, process 600 may include determining an identifier associated with the key (block 620). For example, the quantum key-distribution device may determine an identifier associated with the key, as described above.

As further shown in FIG. 6, process 600 may include determining a particular time window associated with the key (block 630). For example, the quantum key-distribution device may determine a particular time window associated with the key, as described above.

As further shown in FIG. 6, process 600 may include sending, to a node, a first message that includes the identifier associated with the key, wherein the first message is sent to the node before expiration of the particular time window (block 640). For example, the quantum key-distribution device may send, to a node, a first message that includes the identifier associated with the key, as described above. In some implementations, the first message is sent to the node before expiration of the particular time window.

As further shown in FIG. 6, process 600 may include sending, to the node, a second message that includes the key and information indicating the particular time window, wherein the second message is sent to the node after expiration of the particular time window (block 650). For example, the quantum key-distribution device may send, to the node, a second message that includes the key and information indicating the particular time window, as described above. In some implementations, the second message is sent to the node after expiration of the particular time window.

Process 600 may include additional implementations, such as any single implementation or any combination of implementations described below and/or in connection with one or more other processes described elsewhere herein.

In a first implementation, process 600 includes receiving, from the node and before sending the first message, a third message that includes a request for the identifier associated with the key, wherein the first message is sent based on the request included in the third message.

In a second implementation, alone or in combination with the first implementation, process 600 includes sending, to one or more other nodes, the first message, wherein the first message is sent to the one or more other nodes before expiration of the particular time window.

In a third implementation, alone or in combination with one or more of the first and second implementations, process 600 includes sending, to one or more other nodes, the second message, wherein the second message is sent to the one or more other nodes after expiration of the particular time window.

In a fourth implementation, alone or in combination with one or more of the first through third implementations, sending the first message to the node causes the node to send a third message to another node that includes a request to perform at least one task, and sending the second message to the node causes the node to process, based on the second message, a fourth message to determine whether the fourth message is valid, wherein the fourth message includes information associated with performance of the at least one task by the other node and information indicating a time of performance of the at least one task by the other node.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
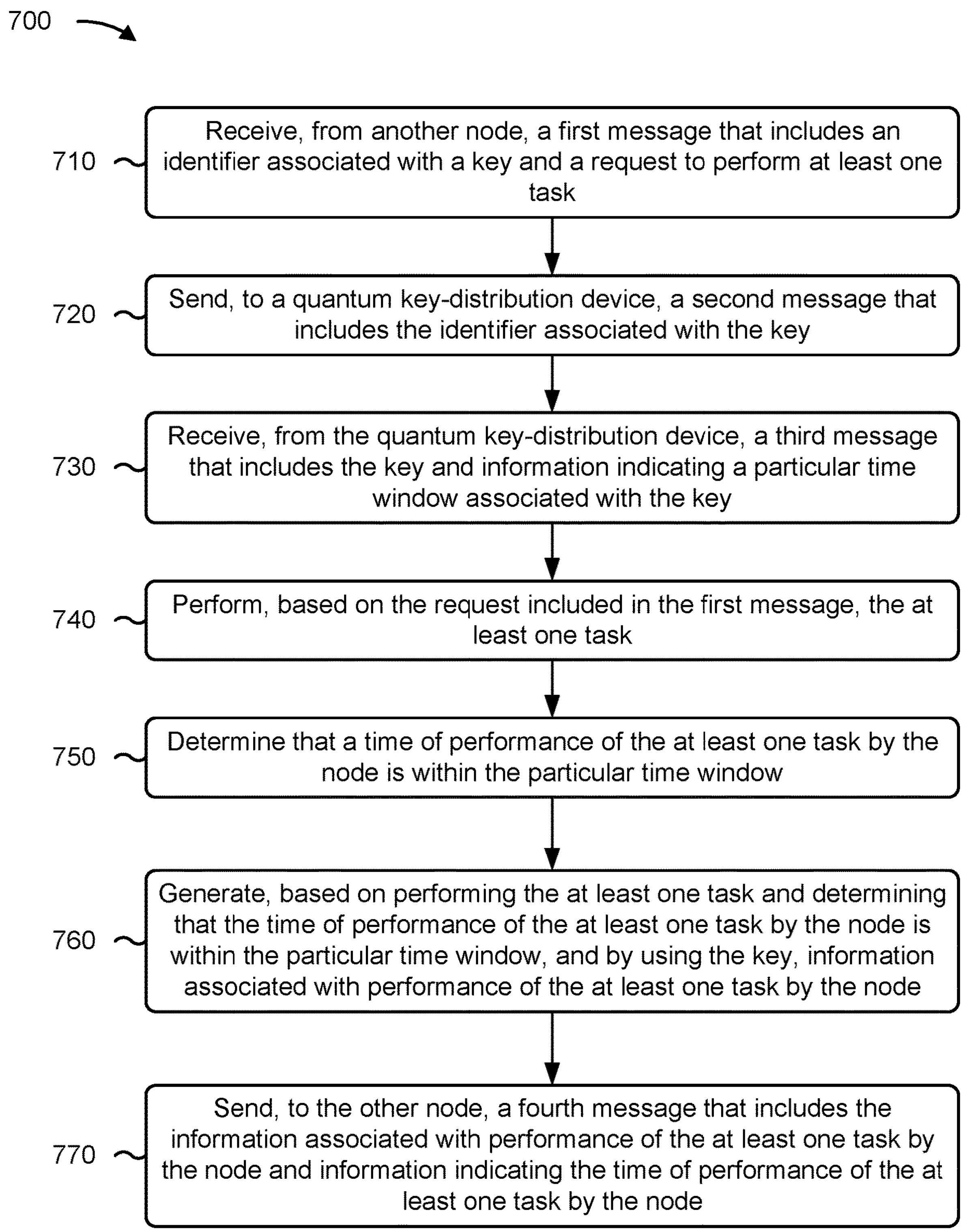

FIG. 7 is a flowchart of an example process 700 associated with delayed quantum key-distribution. In some implementations, one or more process blocks of FIG. 7 are performed by a node (e.g., task node 230). In some implementations, one or more process blocks of FIG. 7 are performed by another device or a group of devices separate from or including the node, such as a quantum key-distribution device (e.g., QKD device 210) and/or one or more other nodes (e.g., one or more other validation nodes 220). Additionally, or alternatively, one or more process blocks of FIG. 7 may be performed by one or more components of device 300, such as processor 320, memory 330, input component 340, output component 350, and/or communication component 360; one or more components of device 400, such as input component 410, switching component 420, output component 430, and/or controller 440; or one or more components of another device.

As shown in FIG. 7, process 700 may include receiving, from another node, a first message that includes an identifier associated with a key and a request to perform at least one task (block 710). For example, the node may receive, from another node, a first message that includes an identifier associated with a key and a request to perform at least one task, as described above.

As further shown in FIG. 7, process 700 may include sending, to a quantum key-distribution device, a second message that includes the identifier associated with the key (block 720). For example, the node may send, to a quantum key-distribution device, a second message that includes the identifier associated with the key, as described above.

As further shown in FIG. 7, process 700 may include receiving, from the quantum key-distribution device, a third message that includes the key and information indicating a particular time window associated with the key (block 730). For example, the node may receive, from the quantum key-distribution device, a third message that includes the key and information indicating a particular time window associated with the key, as described above.

As further shown in FIG. 7, process 700 may include performing, based on the request included in the first message, the at least one task (block 740). For example, the node may perform, based on the request included in the first message, the at least one task, as described above.

As further shown in FIG. 7, process 700 may include determining that a time of performance of the at least one task by the node is within the particular time window (block 750). For example, the node may determine that a time of performance of the at least one task by the node is within the particular time window, as described above.

As further shown in FIG. 7, process 700 may include generating, based on performing the at least one task and determining that the time of performance of the at least one task by the node is within the particular time window, and by using the key, information associated with performance of the at least one task by the node (block 760). For example, the node may generate, based on performing the at least one task and determining that the time of performance of the at least one task by the node is within the particular time window, and by using the key, information associated with performance of the at least one task by the node, as described above.

As further shown in FIG. 7, process 700 may include sending, to the other node, a fourth message that includes the information associated with performance of the at least one task by the node and information indicating the time of performance of the at least one task by the node (block 770). For example, the node may send, to the other node, a fourth message that includes the information associated with performance of the at least one task by the node and information indicating the time of performance of the at least one task by the node, as described above.

Process 700 may include additional implementations, such as any single implementation or any combination of implementations described below and/or in connection with one or more other processes described elsewhere herein.

In a first implementation, sending the fourth message to the other node causes the other node to process the fourth message using the key to determine whether the fourth message is valid, wherein the key is to be received by the other node from another quantum key-distribution device after expiration of the particular time window.

In a second implementation, alone or in combination with the first implementation, generating the information associated with performance of the at least one task by the node includes generating data based on performing the at least one task, and encrypting the data using the key, wherein the encrypted data is the information associated with performance of the at least one task by the node.

In a third implementation, alone or in combination with one or more of the first and second implementations, generating the information associated with performance of the at least one task by the node includes generating data based on performing the at least one task, and generating a signature using the key and based on the data, wherein the data and the signature are the information associated with performance of the at least one task by the node.

In a fourth implementation, alone or in combination with one or more of the first through third implementations, process 700 includes sending the fourth message to one or more additional nodes.

In a fifth implementation, alone or in combination with one or more of the first through fourth implementations, sending the fourth message to the one or more additional nodes causes each of the one or more additional nodes to process the fourth message using the key to determine whether the fourth message is valid, wherein the key is to be received by the one or more additional nodes from another quantum key-distribution device after expiration of the particular time window.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:

receiving, by a node and from a quantum key-distribution device, a first message that includes a request to perform at least one task;

sending, by the node and to another node, a second message that includes the request to perform at least one task, wherein sending the second message to the other node causes the other node to obtain a key from another quantum key-distribution device associated with the quantum key-distribution device;

receiving, by the node and from the other node, a third message that includes information associated with performance of the at least one task by the other node and information indicating a time of performance of the at least one task by the other node;

processing, by the node and based on the key, the third message by identifying the time of performance of the at least one task by the other node to determine whether the third message is valid; and causing, by the node and based on determining whether the third message is valid, one or more actions to be performed by the other node.

2. The method of claim 1, wherein the key is associated with a particular time window.

3. The method of claim 2, further comprising:

determining that the time of performance is within the particular time window.

4. The method of claim 1, wherein causing the one or more actions comprises:

causing a data structure to include at least one entry associated with performance of the at least one task by the other node.

5. The method of claim 1, wherein causing the one or more actions comprises:

causing a data structure to not include any entry associated with performance of the at least one task by the other node.

6. The method of claim 1, further comprising:

receiving, from the quantum key-distribution device after an expiration of a particular time window, a fourth message that includes information indicating the particular time window.

7. The method of claim 1, further comprising:

identifying the key and the particular time window.

8. A non-transitory computer-readable medium storing a set of instructions, the set of instructions comprising:

one or more instructions that, when executed by one or more processors of a quantum key-distribution device, cause the quantum key-distribution device to:

communicate with another quantum key-distribution device to cause a key to be generated;

send, to a node, a first message that includes an identifier associated with the key and information indicating a particular time window, wherein the first message is sent to the node before expiration of the particular time window; and send, to the node, a second message that includes the key and information indicating the particular time window, wherein the second message is sent after expiration of the particular time window.

9. The non-transitory computer readable medium of claim 8, wherein the one or more instructions are to:

determine the particular time window associated with the key.

10. The non-transitory computer readable medium of claim 8, wherein the one or more instructions, when executed by the one or more processors, further cause the quantum key-distribution device to:

receive, before sending the first message, a third message that includes a request for the identifier associated with the key; and determine the identifier associated with the key, wherein the first message is sent based on the request included in the third message.

11. The non-transitory computer readable medium of claim 8, wherein the one or more instructions, when executed by the one or more processors, further cause the quantum key-distribution device to:

send, to one or more other nodes, the first message, wherein the first message is sent to the one or more other nodes before expiration of the particular time window.

12. The non-transitory computer readable medium of claim 8, wherein the one or more instructions, when executed by the one or more processors, further cause the quantum key-distribution device to:

send, to one or more other nodes, the second message, wherein the second message is sent to the one or more other nodes after expiration of the particular time window.

13. The non-transitory computer readable medium of claim 8, wherein the quantum key-distribution device and the other quantum key-distribution device are a pair of quantum key-distribution devices.

14. The non-transitory computer readable medium of claim 8, wherein sending the second message to the node causes the node to process, based on the second message, a third message to determine whether the third message is valid, wherein the third message includes information associated with performance of at least one task by another node and information indicating a time of performance of the at least one task by the other node.

15. A node, comprising:

one or more memories; and one or more processors to:

receive a first message that includes an identifier associated with a key and a request to perform at least one task;

send, to a quantum key-distribution device, a second message that includes the identifier associated with the key;

receive, from the quantum key-distribution device, a third message that includes the key and information indicating a particular time window associated with the key;

perform, based on the request included in the first message, the at least one task; and generate, based on determining that a time of performance of the at least one task is within the particular time window, and by using the key, information associated with performance of the at least one task.

16. The node of claim 15, wherein the one or more processors are further to:

send, by using the key, a fourth message that includes information associated with performance of the at least one task and information indicating the time of performance of the at least one task is within the particular time window.

17. The node of claim 15, wherein the one or more processors are further to:

send a fourth message to one or more additional nodes.

18. The node of claim 15, wherein the quantum key-distribution device is one quantum key-distribution device in a pair of quantum key-distribution devices.

19. The node of claim 15, wherein the one or more processors, when generating the information associated with performance of the at least one task, are to:

generate data based on performing the at least one task.

20. The node of claim 19, wherein the one or more processors, when generating the information associated with performance of the at least one task, are to:

generate a signature using the key and based on the data, wherein the data and the signature are the information associated with performance of the at least one task.

* * * * *